United States Patent [19]

Heartz

[11] 4,017,985

[45] Apr. 19, 1977

[54] MULTISENSOR DIGITAL IMAGE GENERATOR

[75] Inventor: Robert A. Heartz, Deland, Fla.

[73] Assignee: General Electric Company, Fairfield, Conn.

[22] Filed: Aug. 22, 1975

[21] Appl. No.: 607,063

[52] U.S. Cl. .............................................. 35/10.4
[51] Int. Cl.$^2$ ........................................... G09B 9/00
[58] Field of Search ..................................... 35/10.4

[56] References Cited

UNITED STATES PATENTS

| 3,439,105 | 4/1969 | Ebeling et al. | 35/10.4 X |
| 3,446,903 | 5/1969 | Beizer | 35/10.4 |
| 3,448,201 | 6/1969 | Hannon | 35/10.4 |
| 3,769,442 | 10/1973 | Heartz et al. | 35/10.4 |
| 3,885,323 | 5/1975 | Kaase et al. | 35/10.4 |
| 3,909,605 | 9/1975 | Rowe et al. | 35/10.4 X |

*Primary Examiner*—T.H. Tubbesing
*Attorney, Agent, or Firm*—Allen E. Amgott; Raymond H. Quist

[57] ABSTRACT

From stored environmental digital data giving coordinates of terrain features such as ridges and valleys and their associated brightness and color there is selected data on features lying in a vertical plane extending from a center which is the ground position of an elevated viewpoint. By data-processing means, the terrain elevation profile and the color profile for the vertical plane are generated. These profiles are then converted to a radar intensity profile by incrementing a ground sweep or to a perspective color profile by incrementing the view angle sweep. The process is repeated for each next adjacent sector until the entire desired azimuth range is covered. Presentation means is swept vertically, reproducing stored terrain profile patterns, with successive vertical sweeps lying side by side. Using equal angle increments for successive azimuth angles gives perspective representation for a spherical display. Equal successive increments in tangent of the angle give exact perspective for a flat display such as a TV monitor. By including radar reflectivity in environmental data store, simulated radar PPI display is obtainable from same store, using somewhat similar sweep techniques. Visual and radar simulations may be placed to be viewed side by side, for training in comparison of radar return with visual scene of same terrain.

2 Claims, 11 Drawing Figures

MULTISENSOR DIGITAL IMAGE GENERATOR

CROSS REFERENCE TO RELATED APPLICATION

RADAR TERRAIN SIGNAL SIMULATOR, Ser. No. 464,928, filed Apr. 29, 1974 by Arthur J. Heidrich, and assigned to the assignee of this application, now abandoned.

BACKGROUND OF THE INVENTION

1. Field of the Invention

This invention pertains to the simulation of visual and other sensor images by data-processing means.

2. Description of the Prior Art

The general prior art of producing by data-processing means visual representations of objects whose various vertices, edges, and planes are defined by data referred to a system of axes, usually cartesian, is found in U.S. Pat. Nos. 3,603,703 (Warnock), 3,621,214 (Romney et al.), and 3,665,408 (Erdahl et al.). These teach general means for converting such data into a two-dimensional perspective view, with tests for determining which of several overlapping objects will be visible and conceal the others. The scan employed for presentation of the visual image on a cathode-ray tube is a conventional horizontally scanned raster similar to that used in television. U.S. Pat. No. 3,671,729 (Lux) teaches means to cause a mechanical plotter to draw curves or profiles (provided as electrical input signals giving elevation and range for successive radial scans) in which the profile parts which would be out of the field of view of an elevated observer are omitted. The device is not indicated as having any application to electronic image generation, nor does it appear that it could be so applied.

U.S. Pat. No. 3,769,442 of the applicant et al. describes a process for producing a compressed data base for a radar land mass simulator.

No prior method is known to the applicant which in simulating a visual scene employs a radial scan with increasing angle of view and suppression of invisible surfaces by a simple angle comparison, nor any in which perspective is simulated by presenting radial vertical sweeps with the sweep azimuth angle as the horizontal coordinate of the presentation. Also, no prior method is known whereby radar, visual and other sensor images can be generated from a common data source.

SUMMARY OF THE INVENTION

Terrain is described numerically with reference to a convenient system of axes, commonly cartesian, by storing the coordinates of the initial and terminal points of straight-line approximations to parts of a ridge, valley, or coast line. These straight-line approximations may conveniently be distinguished from other lines by calling them "terrain lines". The visual characteristics (reflectivity and color) of surfaces bounded by the straight lines are also stored; the radar and other non-visual reflectivities of the surfaces may be stored. Viewpoint coordinates are specified. In conventional procedure the terrain data would be used to determine the coordinates, in a view window, of rays from the viewpoint to visible points in the stored terrain. These view window coordinates and data would then be organized into successive picture bit sequences found in a raster of horizontal lines extending over the view window; and the successively found points in successive lines would be stored and read out to a display device with a corresponding scan raster.

According to a first embodiment of my invention (FIG. 1) a viewpoint 6 is chosen which represents the simulated location of the observer of a scene to be simulated; it is at an altitude h above its ground position 7. Ground position 7 serves as an origin for orthogonal axes X and Y lying in the ground plane, and Z which is normal to the ground. Sweep planes such as 2 are chosen which extend vertically through the origin 7; the azimuth or scan angle of such a sweep plane 2 is measured by the angle $\theta$ between its intersection with the ground plane and the X axis. A sweep line 4 (which is a simulation of the line of sight of the observer) extends from viewpoint 6 at a view angle $\phi$ measured from the horizontal and intersects a sweep profile 8 defined by terrain lines 10, 12, 14, and 16. The term "terrain lines" is used to emphasize that the points numbered 10, 12, 14, and 16 are actually the intersections in the sweep plane 2 of terrain lines which intersect plane 2. Similarly, what is actually a straight line, such as 12 – 14, in the drawing, will be called a plane, since it is actually the intersection with plane 2 of a plane in the terrain. Successive intersections in adjacent sweep planes recreate the terrain lines and planes.

Figure 1:
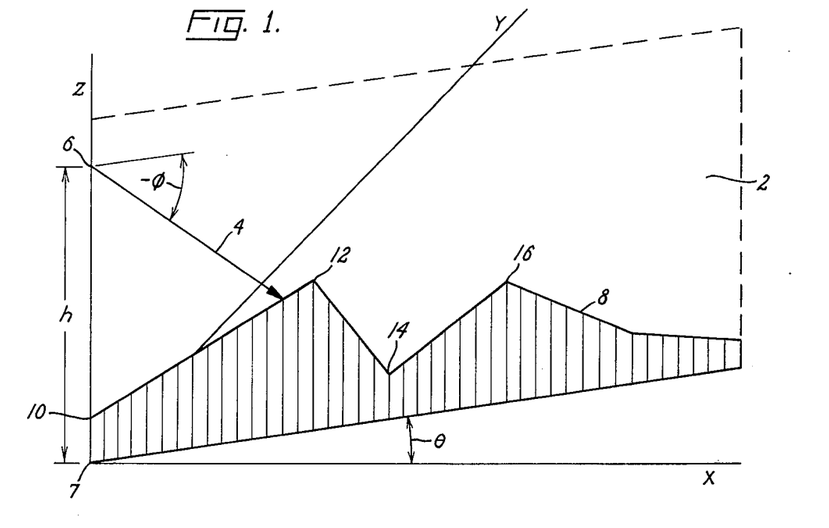
FIG. 1 represents the basic scan pattern of the first embodiment of the invention.

The general scanning and sweeping pattern corresponding to the raster of e.g. an iconoscope is produced by selecting a sweep angle $\theta$ and causing the view angle $\phi$ to change from an initial value of 90° (i.e. normal to the XY ground plane) to smaller values, which will cause it to sweep profile 8 to successively increasing ranges from ground position 7.

It is evident by inspection that plane 12 – 14 will be concealed from the viewpoint 6 by plane 10 – 12, and part of plane 14 – 16 will also be concealed. More specifically, it is evident that if sweep line 4 moves to 12, view angle $\phi$ will have a given magnitude; but if sweep line 4 then moves to increasing ranges, down the sweep profile to 14, the magnitude of $\phi$ will increase. It is thus apparent from FIG. 1 that if there is an increase in magnitude of view angle $\phi$ with increase in the range to which sweep line 4 extends, the point to which 4 extends will be concealed. This criterion is employed to detect when special procedures are required to determine blocking out or concealment of terrain surfaces.

To carry out the procedures outlined conceptually, the coordinates of terrain lines in a given sweep plane are stored, together with the visual (or other emissive) characteristics of the planes which they bound. Such a sweep profile is then read out at successively increasing values of the range coordinate, and used to control a cathode-ray display, visual characteristics such as brightness and color being decoded and caused to control display brightness and color in conventional fashion. The display scanning pattern, or raster, is quite unconventional in that it duplicates the pattern of the sweep profiles; that is, display sweeps are presented vertically with coordinates equal to the view angle, or to the tangent of the view angle. Sweep profiles may be generated for successive adjacent sweep planes (corresponding in general to a non-interlaced conventional raster) or alternately for all odd-numbered and all even-numbered sweep planes in a sequence (corresponding to an interlaced conventional raster). The side-by-side spacing of the vertical display sweeps of successive or alternating (interlaced) scans may be proportional to the scan angle, or the tangent of the azimuth angle. For a true perspective projection upon a flat view window plane, represented by a flat display screen (the equivalent of a "picture plane" of conventional perspective drawing), displacements from the window central point are proportional to the tangent of the angle between a ray from the view point to a terrain point and the normal ("boresight") from the viewpoint to the view window plane. In the first embodiment of my invention, the observer's boresight is constrained to be horizontal. In the second embodiment, means are provided for taking account of changes in the boresight attitude.

The sweep pattern employed yields a major advantage. It is substantially the same as the physical sweep pattern of a radar system; and the radar shadowing by intervening terrain is similar to visual obstruction. Thus if radar reflectivity is encoded in the terrain data together with visual characteristics, the same data may be employed to produce a simulation of the radar picture obtained from the same terrain. The scanning pattern employed in displaying the radar data will usually differ from that employed for a visual simulation being commonly a conventional plan position indicator display. In such case, an operator can compare radar and visual simulations (which may conveniently be displayed side by side) and learn to relate terrain features seen by eye with the radar returns from the same terrain.

More generally, techniques similar to those used for simulating an ocularly observed image may be used to simulate the effect of a passive system such as a infrared sensor in which the sensor merely observes radiation without regard to its transit time from the source; and techniques similar to those for simulating radar returns may be used to simulate the effect of any active system which gives range by measuring transit times.

DESCRIPTION OF THE PREFERRED EMBODIMENTS

Figure 2:
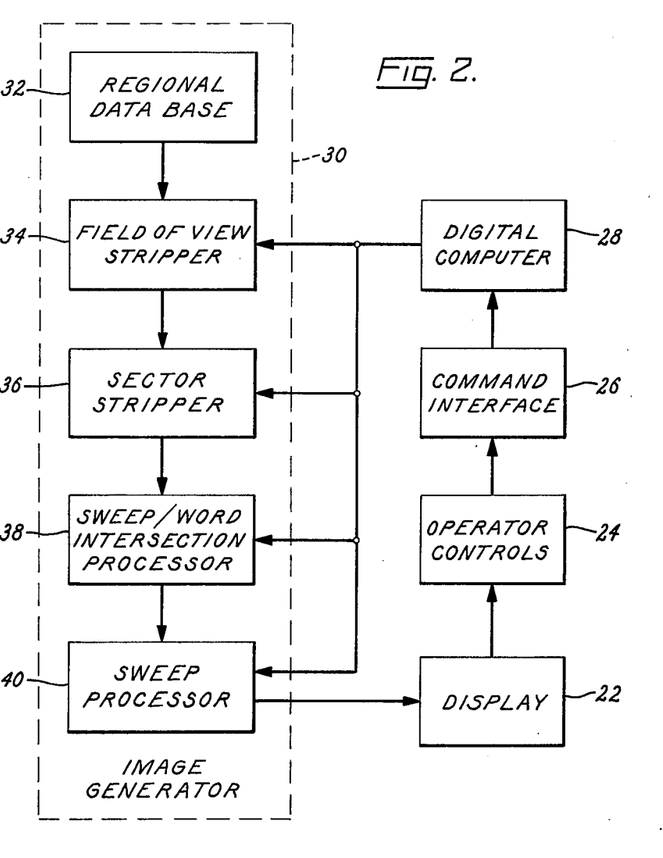
FIG. 2 represents the general organization of the first embodiment.

In FIG. 2 there is represented in block diagram form an embodiment of my invention. The display 22 (preferably a cathode ray tube) upon which the simulated scene appears may be viewed by a human operator, not represented, who operates operator controls 24 which ordinarily simulate the controls of a vehicle and produce signals which, via command interface 26 (which converts the outputs of the operator controls into form suitable for entry into digital computer 28) are fed to general-purpose computer 28. Computer 28, from stored information on the characteristics of the vehicle being simulated, converts the signals from command interface 26 into changes in vehicle course and attitude. These functions, while intimately pertinent to practical application of my invention, in fact serve only to provide information on the location of viewpoint 6 of FIG. 1, and the attitude of the normal to the field of view.

The image generator proper lies within the dashed rectangle 30. Regional data store, or base, 32 is a digital description of the environment. In practice it usually contains description of a region appreciably larger than the particular area to be simulated in a given view, and hence the selection of those items required for a particular simulation is a standard step or steps in the functioning of the simulator. The regional data base consists of a contiguous string of lines and points which describe terrain features such as ridges and valleys, boundaries between surfaces of differing reflectivity or emissivity (including both visible color and brightness and emissivity in other spectral regions of interest), coded descriptions of reflectivity and emissivity, and boundaries or simple lines or dots representing culture such as buildings, bridges, and roads. Each data base word consists of cartesian coordinates of a line end point, reflectivity and/or emissivity to the right and left of the line, (or, for cultural objects, the intensity and width to be displayed) and an identifying flag. U.S. Pat. No. 3,769,442, of Heartz et al., describes a similar data base which is, however, confined to radar reflectivities. To conserve memory requirement and reduce word length, the data base may be defined in incremental or delta format, in which the cartesian coordinates are expressed as the increment in those values from their previous value. While conversion from delta to whole values or vice versa is simply accomplished in data processing by accumulation or subtraction, description is simplified by the use of whole values, which will be employed.

The entire regional data base 32 content is read out once each frame time. Assuming a standard television frame frequency of 30 frames per second, or about 33 milliseconds per frame, and a memory readout rate of one word per microsecond, the maximum number of words in the region data base will be 33,000.

Since this large number of words contains data on an entire region, it is necessary to select from it only those which will lie within the field of view of an observer at viewpoint 6 of FIG. 1. The criteria for such selection, as well as much of the additional processing of the selected data, can most conveniently be performed if the ground position 7 of viewpoint 6 is used as the origin. The standard analytic geometric formula for translating a coordinate $x$ from an origin at $X=0$ to a new origin at $X=a$ is $x_{new} = x_{old} - a$.

FIG. 2 shows command interface 26 connected to receive signals from operator controls 24 and to transmit signals to digital computer 28. Digital computer 28 thereby receives data regarding the location of viewpoint 6, and is thereby enabled to calculate and transmit to translator 42 of FIG. 3 the coordinates $X_R$ and $Y_R$ of the ground position 7. Translator 42 receives the coordinates $X_n$ and $Y_n$ of each point N from regional data base 32 and translates them to the new origin at $X_R$ and $Y_R$, the translation being signified by primes on the translated coordinates, as $X_n'$ and $Y_n'$. These are fed to delay 48, which receives $Z_n$ and the reflectivity and/or emissivity code directly from regional data base 32. Since the translation of the origin has been strictly in the $x, y$ plane, it does not affect any $z$ coordinates, and hence no operation upon $Z_n$ is required. The codes described physical characteristics of the terrain, and will obviously not be altered by a purely mathematical operation upon coordinates.

Figure 11:
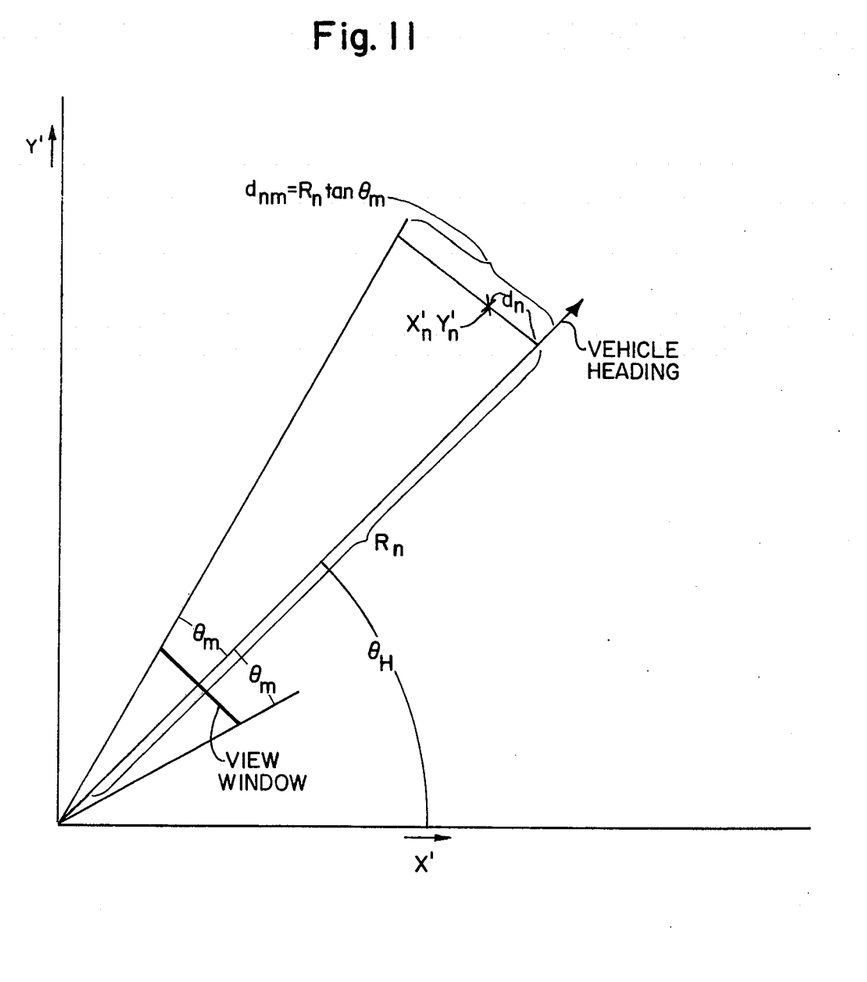
FIG. 11 illustrates the geometry discussed in the specification.

The field of view from viewpoint 6 will be bounded in angle. If the hypothetical vehicle located at viewpoint 6 has a certain size of observation window, the sides of that observation window will determine the bounds, in azimuth, of the geometrical "view window" which determines which regional features will be visible in the simulation, and hence what regional data are to be presented. FIG. 11 represents the X', Y' plane with 7, the viewpoint and vehicle ground position, as origin. A line extending at angle $\theta_H$ with the X' axis represents the vehicle heading and is normal to the vehicle view window, which subtends on either side an angle $\theta_m$ from the vehicle heading. The vehicle heading $\theta_H$ is, of course, determined by the operator of operator controls 24; and the bounding angles $\theta_m$ are determined by the vehicle construction. Both these parameters are thus available as given data. Computer 28 computes sin $\theta_H$ and cos $\theta_H$, and furnishes these to rotator 44 which receives translated coordinates $X_n'$ and $Y_n'$ and rotates them to new axes, specifically the vehicle heading direction at angle $\theta_H$ with the X' axis, and the normal to the vehicle heading direction. To phrase the same operation in different terms, rotator 44 (which might for this purpose equally well be called a resolver) determines the components along these axes of the line from the origin (at 6, and 7) to $X_n'$, $Y_n'$. These are shown in FIG. 11 as $R_n$ along the vehicle heading direction, and $d_n$ normal to $R_n$. $R_n$ is a close approximation to the ground range from the original to $X_n'$, $Y_n'$.

Since $\theta_m$ is given, the computer 28 can calculate its tangent, and furnish $\tan\theta_m$ to multiplier 46 which receives $R_n$ from rotator 44. Multiplier 46 calculates $R_n \tan \theta_m$ which is $d_{nm}$ — the maximum normal distance from $R_n$ which will be visible in the view window.

Calculation of $d_{nm}$ provides bounds in azimuth only. The field of view is also bounded vertically. This bound is expressed by maximum range $R_m$, provided by computer 28.

Figure 3:
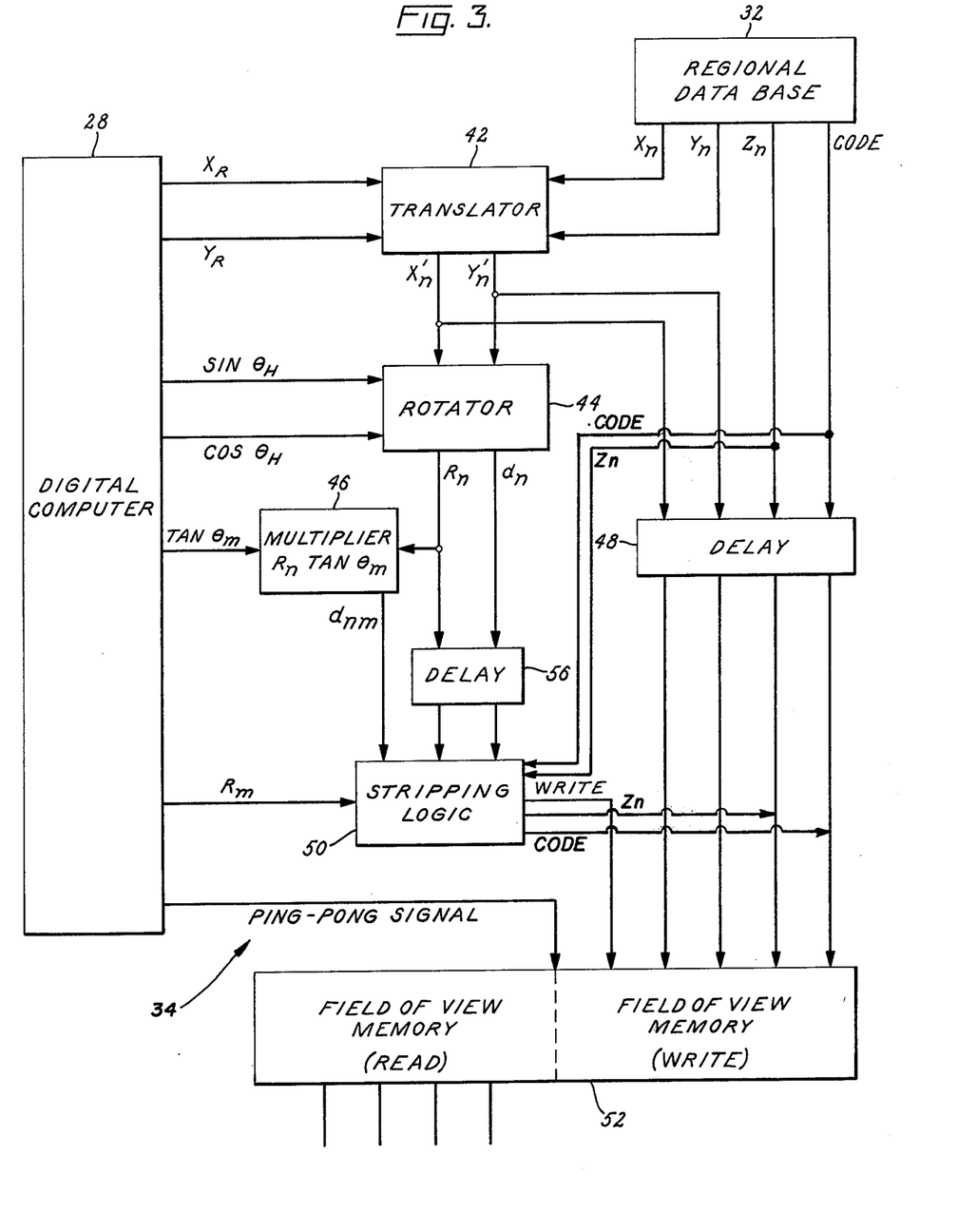
FIG. 3 represents a detail of FIG. 2.

All these selection parameters—$R_m$, $d_{nm}$, $R_n$ and $d_n$ (which last two are delayed by 56 so they arrive only after $d_{nm}$ has been computed), —are fed to stripping logic 50. While the data processing operations have been described thus far largely as operations upon single points in the X, Y plane, the stripping logic is concerned with the lines whose end points are pairs of such points, for each of which $R_n$ and $d_n$ have been computed. While the organization of logical elements to perform stripping logic is detailed in FIG. 4, its logical functions will be given first: If the $R_n$ of either end point is positive and less than $R_m$, and either (1) $d_n$ of one of the end points is less than $d_{nm}$ or (2) the values of $d_n$ for the two end points are of opposite sign, then the line they define lies in the field of view. If either of these criteria are met, stripping logic 50 sends a "write" signal to field-of-view (FOV) memory 52 which causes the delayed $X_n'$, $Y_n'$, $Z_n$, and CODE signals to be read into the FOV memory 52.

FOV memory 52 has two parts which operate out of time phase with each other. One part is being filled or written into while the other is being read out; when the two operations are complete (i.e. at the end of a frame period) their functions are reversed, most conveniently by a control signal from computer 28 which is the most convenient source of timing and control signals, being assumed to be provided with its own clock source. This alternation of operation between two like stores is known in the art as ping-ponging.

The stripping logic as thus far described fills FOV memory 52 with those data words which lie within the selected field of view. But the code descriptive of the reflectivity or emissivity at the beginning of a sweep will often be given by a word lying outside of the field of view, having a negative value of $R_n$. It may therefore be made a special added requirement of stripping logic 50 to identify the data word having the smallest magnitude of negative $R_n$, and also enter that in the FOV memory 52. This requirement is useful only in a restricted class of cases, is shown for completeness, and is not considered part of the preferred way of practicing my invention.

Figure 4:
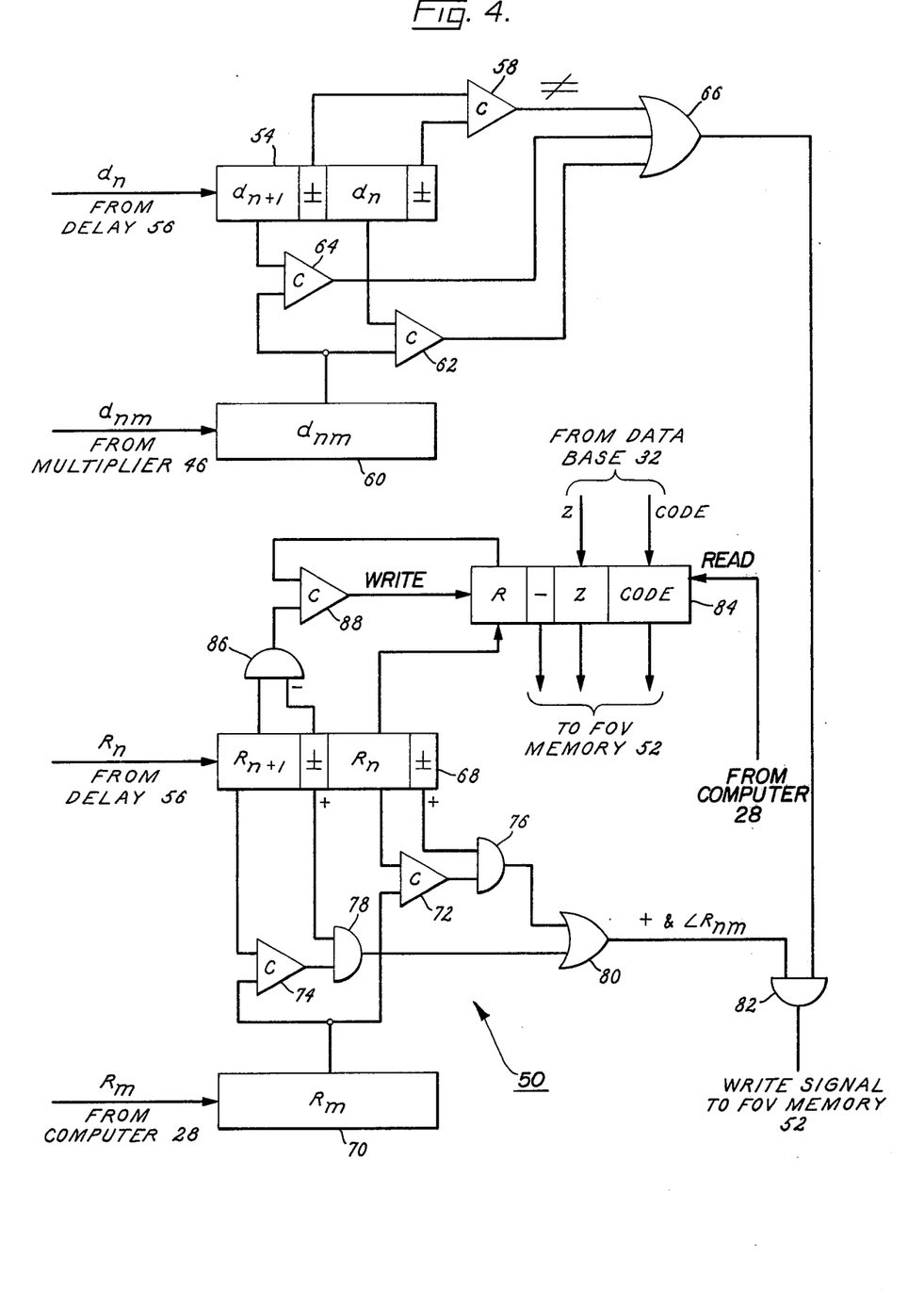
FIGS. 4, 5, and 6 represent other details of FIG. 2.

FIG. 4 represents the logical organization of stripping logic 50 of FIG. 3. Shift register 54 receives $d_n$ from rotator 44, via delay 56. It is long enough to contain two values of $d_n$ for two adjacent or successive end points. The sign bit for each is represented by a $\pm$. These are fed to comparator 58, which gives an output if they are unequal—that is, different in sign. Register 60 receives $d_{nm}$ from multiplier 46 of FIG. 3; its content is one input to comparators 62 and 64, whose other inputs are $d_n$ and $d_{n+1}$, respectively. Comparators 62 and 64 give an output if $d_n$ or $d_{n+1}$ is less than $d_{nm}$. The outputs of comparators 58, 62, and 64 are fed to buffer or OR 66, whose output indicates fulfilment of one of the partial stripping logic criteria numbered (1) or (2) disclosed hereinbefore. $R_n$ from rotator 44, via delay 56 of FIG. 3, is fed to shift register 68, and $R_m$ from computer 28 of FIG. 3 is entered into register 70. Comparators 72 and 74 are connected to produce outputs if $R_n$ and $R_{n+1}$, respectively, are less than $R_m$; but to meet the further logical requirement that $R_n$ or $R_{n+1}$ be positive, the outputs of comparators 72 and 74 are gated through gates 76 and 78 which are enabled only if the sign bits in their associated portions of register 68 are positive in indication. The outputs of these gates 76 and 78 are fed to buffer or OR 80, whose output indicates fulfilment of the requirement that $R_n$ or $R_{n+1}$ be less than $R_m$ and positive. The outputs of buffer 66 and 80 are fed to gate 82, whose output indicates fulfilment of all of the logical requirements of stripping logic 50, and so constitutes the WRITE signal indicated in FIG. 3 as going to FOV memory 52.

Satisfaction of supplemental requirement that stripping logic 50 identify and send to FOV memory 52 the negative $R_n$ of smallest magnitude, and its associated word data, requires that the word data for each potential candidate be stored pending further samples of negative $R_n$. For this purpose store 84 is provided. It is designed somewhat similarly to FOV memory 52 in that it can receive a WRITE instruction which causes it to receive data over various input lines. Z and CODE inputs are received from regional data base 32 of FIG. 3; but the R content is received from an intermediate connection in register 68. It must be recognized that register 68 will receive a value of R first in the section marked $R_{n+1}$, and then shift it into the section marked $R_n$ when a new value of R, properly identified as $R_{n+1}$, is shifted into the section so marked. Gate 86, if enabled by a negative indication in the sign portion of the $R_{n+1}$ section, will feed the magnitude of $R_{n+1}$ as an input to comparator 88, whose other input is the R section content of store 84 — a previously stored value of some earlier negative $R_n$. If $R_{n+1}$ is less in magnitude than that stored in store 84, comparator 88 will produce an output which serves as a WRITE instruction to store 84. Responsively to this instruction, store 84 will enter the new value of R as it is being shifted out of the $R_{n+1}$ section of register 68 into the $R_n$ section. It will also enter the corresponding new values of Z and CODE. Thus every time a new smaller magnitude or negative R is found, it and its associated word data are stored in store 84. Clearly, the final value stored in store 84 will be that corresponding to the smallest magnitude of negative R in the entire regional data base. At the end of a frame period, computer 28 of FIG. 3 furnishes a READ instruction to store 84, and a WRITE instruction to FOV memory 52, and the stored values of Z and CODE are read from store 84 into FOV memory 52. This will necessarily occur before computer 28 orders the two parts of FOV memory 52 to alternate their functions. It may at the same time send CLEAR instructions to the various registers.

Since the stripping operation is merely a screening of useful from unneeded words, the precision of the stripping need not be so great as that of the data words themselves, which are transmitted directly from the regional data base 32 to the FOV memory 52. The one exception to this is the store 84, which must have as many significant digits as the original data from data base 32 contain.

The data lying in the field of view have been selected from the maximum of 33,000 words in the regional data base. Assuming a processing rate of one word per microsecond, and recognizing that in the sector stripping operation indicated by 36 of FIG. 2 the entire FOV memory will be read out once each sector period, it is evident that the capacity of the FOV memory 52 must be restricted to 33,000: N, where N is the number of sectors in a field of view. The actual number of sectors in the embodiment being described is thirty-three, so that the maximum word capacity of the FOV memory 52 is set at 1,000 words which sets one millisecond for readout time and is compatible with the rate of 33 milliseconds per frame. The sector stripping operation strongly resembles the field of view stripping, with some simplifications. Translation is not necessary because the origin is already at 7, the ground position of viewpoint 6. Rotation is still necessary for each sector; the $\theta$ will be the mean azimuth of each sector, and $\sin \theta_s$ and $\cos \theta_s$ can be provided by the computer 28. The field of view stripping has eliminated all points with range values greater than the permissible maximum, so that $R_m$ is not needed. Tan $\theta$ —maximum angle-sector is simply the half-angle from the nominal central angle of the given sector to the half-way mark to the next sector. The sector stripping logic is thus reduced to $d_n$ and $d_{n+1}$ comparisons.

As has already been indicated, it is desirable for the sector separation to be based on equal increments to arctan $\theta_s$ rather than equal increments in the azimuth angle $\theta_s$ itself. This may be programmed into computer 28, which is the source of many basic commands, as well as timing and control signals. The details of sector stripping 36 appear in FIG. 5.

Figure 5:
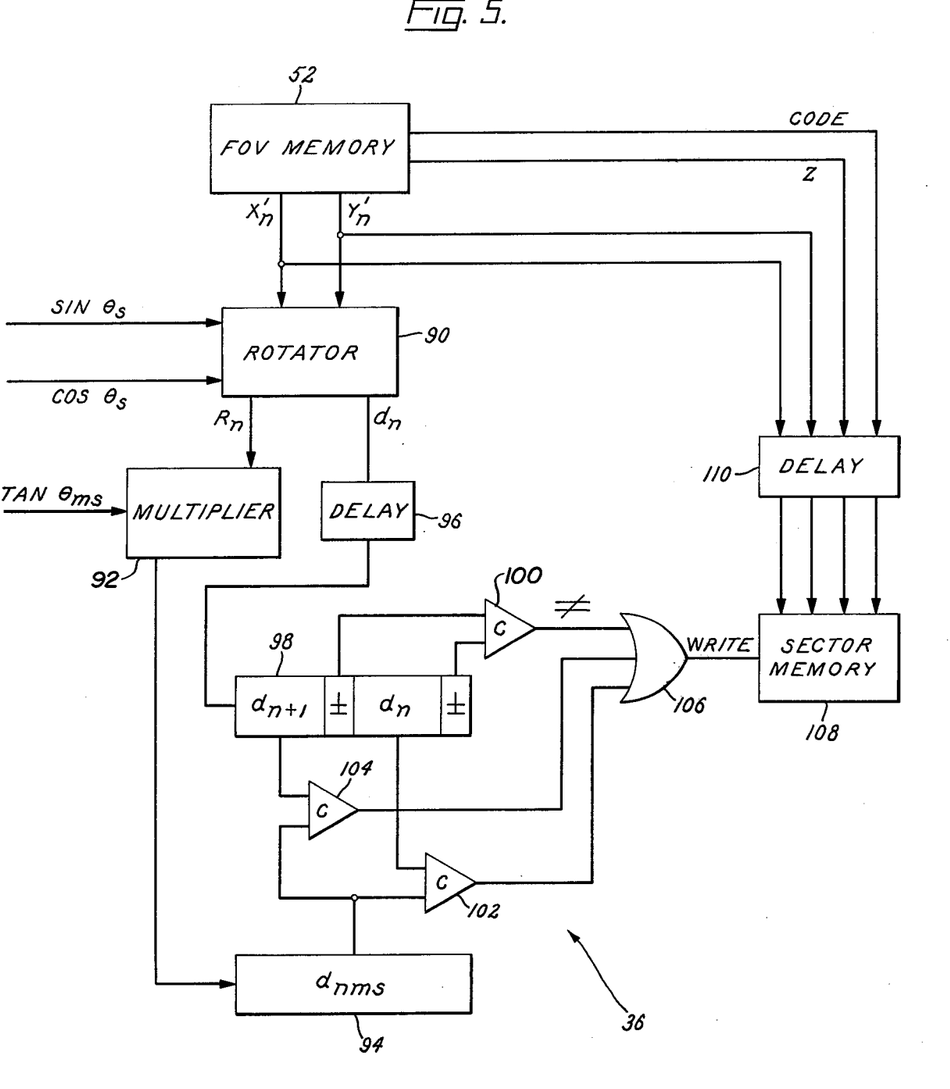

FOV memory 52 is repeated in FIG. 5 for more convenient description. $X_n'$ and $Y_n'$ are fed directly to rotator 90, the homologue of rotator 44 of FIG. 3, which receives from computer 28 the sine and cosine of $\theta_s$, the azimuthal angle of the particular sector being stripped out of 52. It produces as outputs $R_n$ and $d_n$ which differ from similar outputs from rotator 44 of FIG. 3 in that the present outputs are components in, and along the normal to, the sweep plane of the particular sector. Computer 28 provides tan $\theta_{ms}$, where $\theta_{ms}$ is the maximum angle lying within the particular sector, for multiplier 92 (homologue of multiplier 46 of FIG. 3), which produces $d_{nms}$, the maximum normal, at the range $R_n$, which still lies within the sector. This product is fed to register 94 (homologue of register 60 of FIG. 4). After delay by 96, $d_n$ from rotator 90 is fed to register 98, similar to register 68 of FIG. 4. Comparator 100 produces an output if the signs of $d_n$ and $d_{n+1}$ are different. Comparator 102 produces an output if $d_n$ is less than $d_{nms}$, and comparator 104 produces an output if $d_{n+1}$ is less than $d_{nms}$. The three output lines of comparators 100, 102, and 104 pass to buffer or OR 106, whose output is a WRITE instruction to sector memory 108 (which is a two-part ping-ponging memory). $X_n'$, $Y_n'$, Z, and CODE have delayed by 110 and arrive at the proper time to be entered into sector memory 108.

No provision is made in sector stripping for finding the minimum magnitude of negative $R_n$, because that has been found in the FOV stripping operation. The negative $R_n$ is measured with respect to the origin, the one point common to all sectors; it determines the code to be used for each sweep beginning at the origin; but that must clearly be the same for all sweeps. In an ordering of points by range, the negative range will precede any of the positive ranges and hence will determine the code for the beginning of the sweep. This simplified procedure is permissible when the ground position of the observer lies outside of the field of view. A subsequent embodiment discloses a generally valid approach. The period of the sector stripping operation, in the particular embodiment being described, is one millisecond. In general, this period must be sufficiently short to permit stripping of all the sectors to be completed in one frame period.

Figure 6:
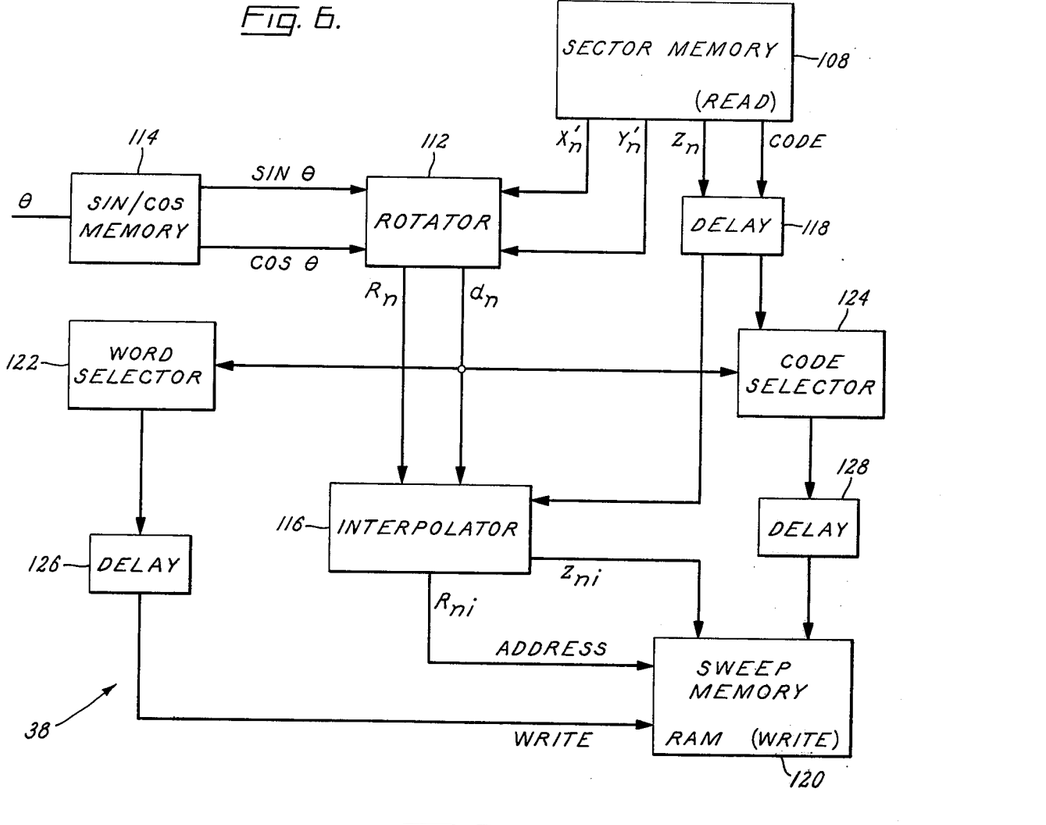

Sweep/line intersection processor 38 of FIG. 2 is detailed in FIG. 6. From sector memory 108, $X_n'$ and $Y_n'$ are read out to rotator 112, which rotates them to the sweep angle $\theta$, whose cosine and sine are provided by sine/cosine memory 114, responsively to the value of $\theta$ which is furnished by computer 28. (These functions could, of course, be furnished by computer 28 itself, but the provision of a simple read-only memory may be desirable as economizing capacity of the more expensive general purpose computer.) The resulting $R_n$ and $d_n$ are passed to interpolator 116, together with $Z_n$ which is delayed by delay 118 to be synchronous with $R_n$ and $d_n$. Interpolator 116 is a special purpose computer which solves the equations.

$$R_{ni} = R_n + d_n \frac{R_n - R_{n-1}}{d_n - d_{n-1}}$$

and $$Z_{ni} = Z_n + d_n \frac{Z_n - Z_{n-1}}{d_n - d_{n-1}}$$

where the subscript $ni$ indicates the value corresponding to the intersections of the line with the sweep line. The output $Z_{ni}$ is connected to an input of sweep memory 120 which is a dual or ping-ponged random access memory— that is, one having specific locations addressable by an address code. In this application, R is the address, and is so connected. Actual writing into sweep memory 120 does not occur until a WRITE order is received. Word selector 122 receives $d_n$ from rotator 112, and generates such a WRITE signal if $d_n$ and its predecessor $d_{n-1}$ are of opposite sign, showing that the line they define crosses the sweep line, or if $d_n$ is zero, showing that it is a point lying on the sweep line.

It is clear that these functions may be performed by a register similar to 54 of FIG. 4, in which successive values of $d_n$ are shifted. A comparator having its inputs connected to the sign bits of $d_n$ and $d_{n+1}$ will give a signal if they are different. A zero value of $d_n$ may be identified by buffing together all the numerical bit outputs and applying them to an inverter. This is highly standard logic and hence is not illustrated in detail.

Since the data word carries both left and right reflectivity or emissivity codes, it is necessary to determine which one is to be used—that is, the direction in which the line from the $n-1$ point to the $n$ point crosses the sweep line. This is indicated by the sign of $d_n$ produced by rotator 112. Code selector 124 receives $d_n$ from rotator 112, and selects the appropriate code from the two read out of sector memory 108. This is readily effected by using the sign bit of $d_n$ control a gating system which opens to one code for one sign, and to the other code for the other sign. Specifically, if $d_n$ is positive, the line from $n-1$ to $n$ must be directed upward with respect to the sweep line, and consequently its right-hand side lies in the direction in which the sweep line is moving. If $d_n$ is negative, clearly the reverse is true and the left-hand side of $d_n$ lies in the direction of the line sweep. Delays 126 and 128 are so chosen that the CODE signal and the WRITE command arrive at sweep memory 120 at the proper times.

Figure 7:
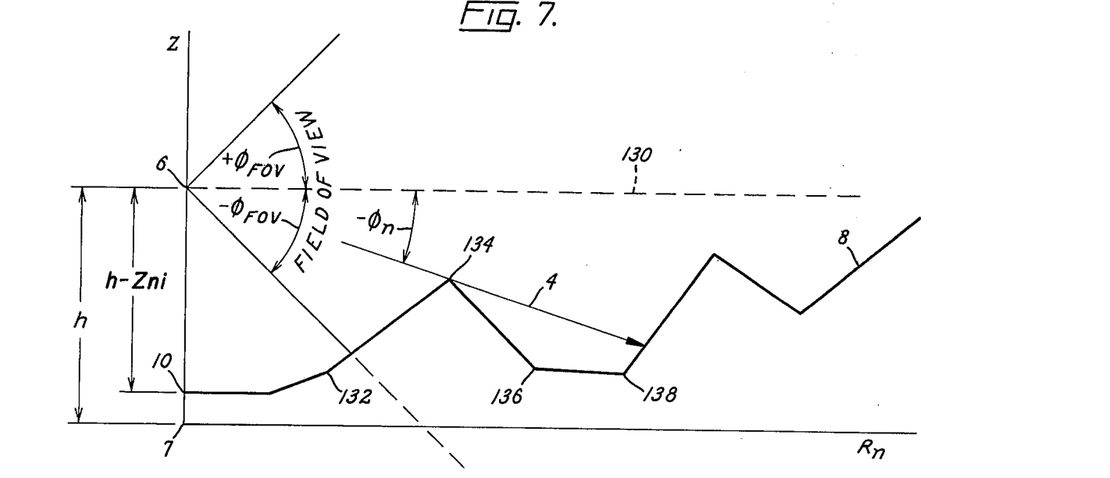
FIG. 7 represents a sweep profile of the scan pattern of FIG. 1.

When the half of sweep memory 120 which is receiving inputs (the other half being read out during this time) is filled, it will contain a complete sweep profile, represented in FIG. 7, which resembles FIG. 1 but contains additional information which is comprehensible only at this stage of the description. Viewpoint 6 and its ground position 7, and the actual terrain elevation above 7, at 10, have the same significance as for FIG. 1. However, FIG. 7 is a representation in a single sweep plane for a single value of $\theta$. The boresight through viewpoint 6 is represented by line 130, horizontal in this particular embodiment and the upper and lower bounds of the FOV are indicated by + and − $\theta_{FOV}$. The elevation $h$ of viewpoint 6 above its ground position 7, and its elevation $h-Z_{nt}$ above terrain at 10 are shown to facilitate understanding. The generic designation is used for the profile 8, and the sweep line is still designated as 4, since it represents only one of an unlimited number of positions of the sweep line. Certain terrain points are numbered in even numbers from 132 to 138, for convenient reference in explaining the operations performed by the apparatus represented in FIG. 8. Sweep memory 120 is again represented in FIG. 8, because the functions incidental to reading out the previously filled half are described. A range counter 140 counts increasing range units which address locations in sweep memory 120. Whenever the range addressed contains data, the code or codes and the value of $Z_{nt}$ are written, together with the range count from counter 140, in stack memory 142, which is a ping-ponged dual memory, whose alternate half is being read out at the time the half presently considered is being filled. In the particular embodiment being described, sweep memory 120 has a capacity of 512 words in each half. Its entire content must be read out in one sweep period, so that the count proceeds at 125 nanoseconds per count. Because it may happen that more than one point in the sweep profile coincides with a given range, excess capacity is provided in the sweep memory to store up to five different codes. (Multiple $Z_{ni}$ storage is not necessary, since a given range point can have but one elevation even though it represents the intersection of several differently reflecting or radiating surfaces.) When a plurality of codes appear at a point, majority weighting is used; if there is no majority, the previous code is retained. All the information stored at a given range address in sweep memory 120 is read into stack memory 142.

Figure 8:
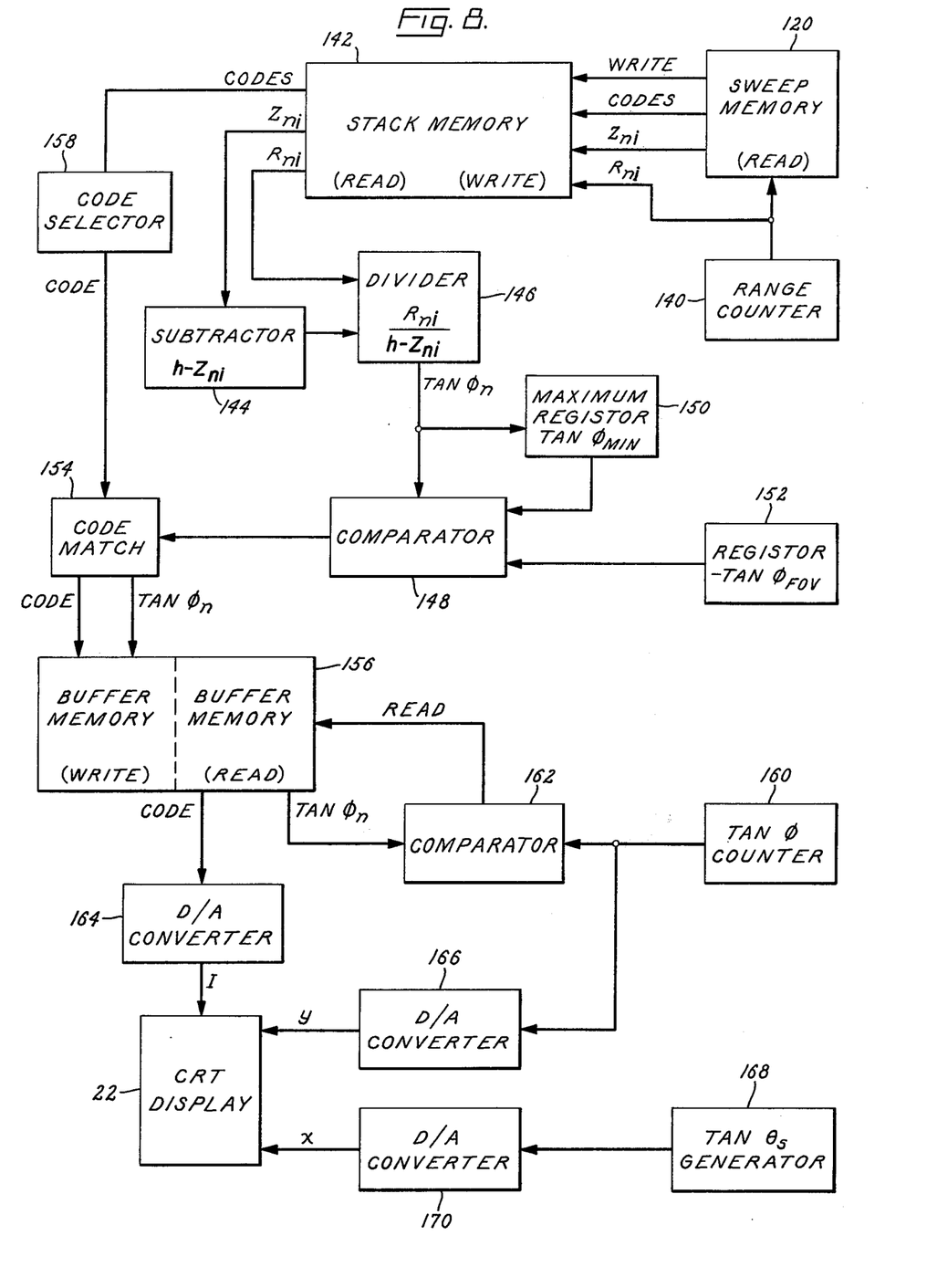
FIG. 8 represents further detail of the first embodiment of the invention.

Despite the 512-word capacity of each half of sweep memory 120, each half of stack memory 142 has a capacity of only 64 words. This is possible because the use of integrated circuit memories makes it economical to place data in sweep memory 120 in order by using range count as the address, even though this is wasteful of memory capacity because in any actual simulation of terrain, most of these address locations are not filled. But when the data are read from sweep memory 120 they are already ordered; and it is therefore possible to place words in 142 in succession because it is known that no subsequent word will appear at a range intermediate between two ranges already written.

When half of stack memory 142 has received all the data in one half of sweep memory 120, it is read out at a word per microsecond. Subtractor 144 subtracts the given $Z_{ni}$ from $h$. This difference is fed to divider 146, which receives $R_n$ from stack memory 142, and divides it by the difference. The result is $\tan \phi_n$ for the line 4 to the given point $n$. In FIG. 7, this will be point 134. For the next operation $\tan \phi$ will be calculated for line 4 extending through point 136. $\tan \phi_n$ has two significances. If it exceeds absolutely $\tan \phi_{FOV}$ (positive or negative) it shows that the point calculated lies outside of the field of view. And if it is less (that is, greater in absolute value but negative because a downward measurement of $\phi$ is considered negative in sign) than a preceding value of $\tan \phi_n$, it shows that the point being calculated lies below the line of sight to an earlier point lying at a smaller range from 7. It will therefore be concealed by the preceding point.

$\tan \phi_n$ is therefore fed from divider 146 to comparator 148, and to maximum register 150. Maximum register 150 is devised to hold a previously stored value unless it receives as an input a still greater value, in which case it stores the new value. (The technique of storing an extreme is exemplified by 68, 84, 86, and 88 of FIG. 4.) Its content is thus the algebraically greatest of all previously received values. Since $\phi$ measured downward is considered negative, this will be in fact the least in absolute value. Register 152 feeds to comparator 148 the tangents, positive and negative, of $\phi_{FOV}$. Comparator 148 performs several comparisons of $\tan \phi_n$. If it exceeds in absolute value $\phi_{FOV}$, there is no output to code match 154, and it sends no entry to buffer memory 156. If $\tan \phi_n$ is algebraically less than $\tan \phi_{max}$ stored in 150, the point, although in the field of view, is blocked by a preceding point, and its data are not entered into buffer memory 156. But if it lies in the field of view, and is not blocked, its code and its value of $\tan \phi_n$ are read into buffer memory 156.

Code select 158 receives the code or codes read out of stack memory 142 and, if more than one code is stored at a given range address, it selects the majority code; or, if there is no majority, it retains the previous code. It transmits the selected code to code match 154. It is to be noted that code select 158 is so located that it receives all codes read from stack memory 142, whether or not these are part of a word which passes the comparison tests of comparator 148. It thus is capable of furnishing the code associated with point 138 even though that point itself will not be visible and so fail the comparison test.

There are thus stored in buffer memory 156 at the completion of a cycle of the operations described, in order of increasing values of range, corresponding to algebraically increasing values of tan $\phi$, the selected code to be introduced in the display at each value of tan $\phi$ which has survived the test by comparator 148—that is, which corresponds to a point which is visible and lies in the field of view. Buffer memory 156 is now ping-ponged; the half which has been written into during the cycle is switched to be read out, and its other half is switched to be written into during the next cycle.

Tan $\phi$ counter 160 is the basic timer of the display system proper. It begins at minus tan $\phi_{FOV}$ and causes comparator 162 to send a READ order to buffer memory 156, which reads out the tangent of the first word in the field of view (134 in FIG. 7) and the code of the preceding point, which passes to converter 164. For a black and white display, converter 164 will be a simple digital-to-analogue converter which produces a suitable beam intensity in the cathode-ray tube of the display; but for color it must be capable of producing, for example, three different control signals to control the beam currents of three different color guns. This is, or course, part of the well known art. The value of tan $\phi_n$ read from buffer memory 156 passes to the comparator 162, which stores and compares it with successive counts from tan $\phi$ counter 160. When a count from counter 160 equals the stored value, comparator 162 sends another READ order to buffer memory 156, which reads out the next value of tan $\phi_n$ to comparator 162, which stores it in place of the previous value. Simultaneously buffer memory 156 reads out the preceding point's code, which is received by converter 164 and processed like its predecessor. In the mean time the successive outputs of tan $\phi$ counter 160 have been received by digital-to-analogue converter 166 to produce a vertical deflection signal for the display 22 of FIG. 2. Thus the color and brightness signified by successive codes are "painted" along the continuing vertical sweep until changed by arriving at a new data point. At the end of the cycle, when tan $\phi$ counter 160 reaches the upper limit of the field of view, the two halves of buffer memory 156 are "ping-ponged" or alternated, and tan $\phi$ generator 168 is stepped to count the next value of the tangent of the scan angle. This output is converted by digital-to-analog converter 170 to provide the horizontal deflection to the cathode-ray tube of display 22.

The embodiment described makes no provision for other than horizontal boresight or for rolling. Moderate rolling may be accommodated by physically rolling the deflecting system of the display. However, it is possible to accommodate rolling, pitching and yawing by a second embodiment.

Standard aircraft aerodynamic notation makes X the roll axis, Y the pitch axis, and Z the yaw axis. Angular rotations around these axes (positive being counter-clockwise viewed from the positive end of the axis) are designated by $\psi$ (psi) for yaw, $\theta$ (theta) for pitch, and $\phi$ (phi) for roll. The standard Euler equations for the cartesian coordinates of a body after rotations in the order indicated are given in the following Table.

TABLE

Subscript B indicates rotated coordinates.

$X_B = M_{11}X + M_{12}Y + M_{13}Z$
$Y_B = M_{21}X + M_{22}Y + M_{23}Z$
$Z_B = M_{31}X + M_{32}Y + M_{33}Z$ where $M_{11} = \cos\theta \cos\mu$
$M_{12} = \cos\theta \sin\mu$
$M_{13} = -\sin\theta$
$M_{21} = \cos\mu \sin\theta \sin\phi - \sin\mu \cos\phi$
$M_{22} = \cos\mu \cos\phi + \sin\mu \sin\theta \sin\phi$
$M_{23} = \cos\theta \sin\phi$
$M_{31} = \cos\mu \sin\theta \cos\phi + \sin\mu \sin\phi$
$M_{32} = \sin\mu \sin\theta \cos\phi - \cos\mu \sin\phi$
$M_{33} = \cos\theta \cos\phi$ It is to be noted that the symbols used in the table, and in the subsequent description of the second embodiment are not the same in significance as those used in the description of the first embodiment, preceding. It appears preferable at this point to adopt the standard aircraft aerodynamic notation, even though some of these symbols have been used previously with different significances. The quantities used in the description of the first embodiment have few exact equivalents in the present embodiment, so that little would be gained by attempting to maintain consistency in the two descriptions; such an attempt would merely make unavailable several convenient and familiar symbols and require the use of other more exotic and hence less desirable ones.

The second embodiment differs from the first in that the entire region data base is rotated by implementation of the full Euler equations. Mathematically, one can either rotate the observer (which is what happens in the physical world), or the scene to be viewed can be rotated. The results are physically the same, but for implementation of this system, rotation of the data base is preferred because then the view window and scan patterns remain constant.

Figure 9:
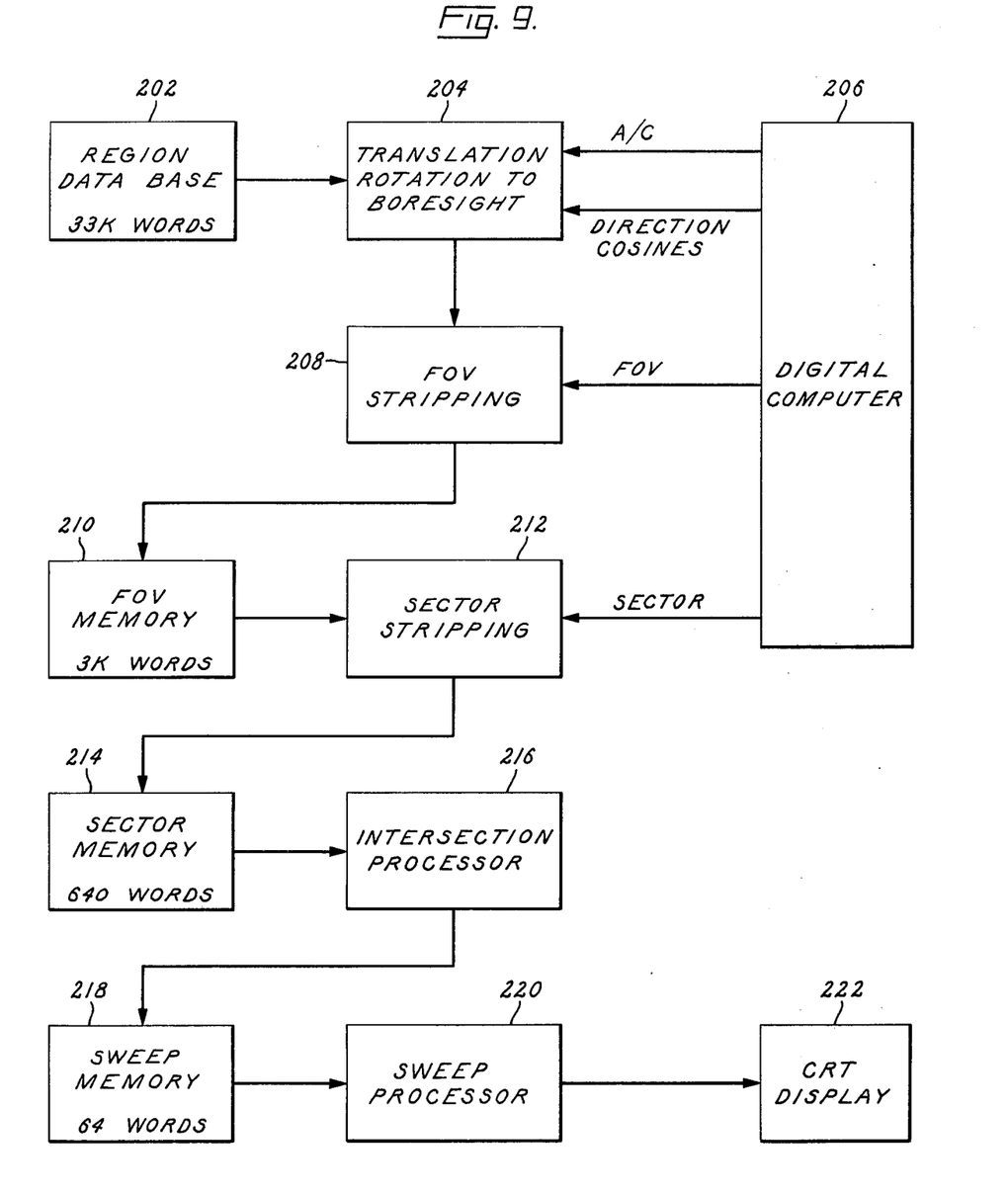
FIG. 9 represents the general organization of a second embodiment of the invention.

The general arrangement of the second embodiment is represented by FIG. 9. (To readily identify reference numbers pertaining to the second embodiment, they will be greater than 200.) The region data base 202 will have a content similar to that of regional data base 32 of FIG. 2 but its Z axis coordinates must always be referred to a standard reference such as sea level. (In the first embodiment, the altitude Z of an object can be defined as a height above terrain).

The data base 202 is read to translation and rotation to boresight unit 204 where X and Y of each data base word are translated to aircraft position. The data base is then rotated to boresight by the full Euler angle equations. This requires nine multiplications of the X, Y, and Z of each data base word by the direction cosines. The digital computer 206 provides to translation and rotation boresight unit 204 the aircraft X and Y coordinates for translation, and the nine Euler angle direction cosines (given in the Table) for rotation. The computation by translation and rotation to boresight unit 204 involves only standard additions and multiplications; but these do have to be paralleled and pipelined so that a data base word is translated and rotated once per microsecond.

The output of unit 204 is then stripped by field of view stripping unit 208. The implementation of units 204 and 208 is similar to that described in FIG. 3, except that rotator 44 incldues Z. The computer 206 provides to unit 208 the field of view parameters; the words are checked, and if they are in the field of view, the rotated coordinates ($X_B$, $Y_B$, $Z_B$) and the codes are written in the FOV memory 210.

The operations from the FOV memory 210 to the CRT display 222 are similar to those described for the first embodiment. FIG. 9 is structured to illustrate a typical data flow. Assuming that the desired display rate is 30 frames per second with 525 sweeps (rasters) per frame, this results in 64 microseconds per sweep. The region data base 202 is read once per frame and processed at a word per microsecond. The FOV memory 210 is read once per sector and there are 10 sectors per frame. The sector memory 214 must be read out and processed every sweep period.

Figure 10:
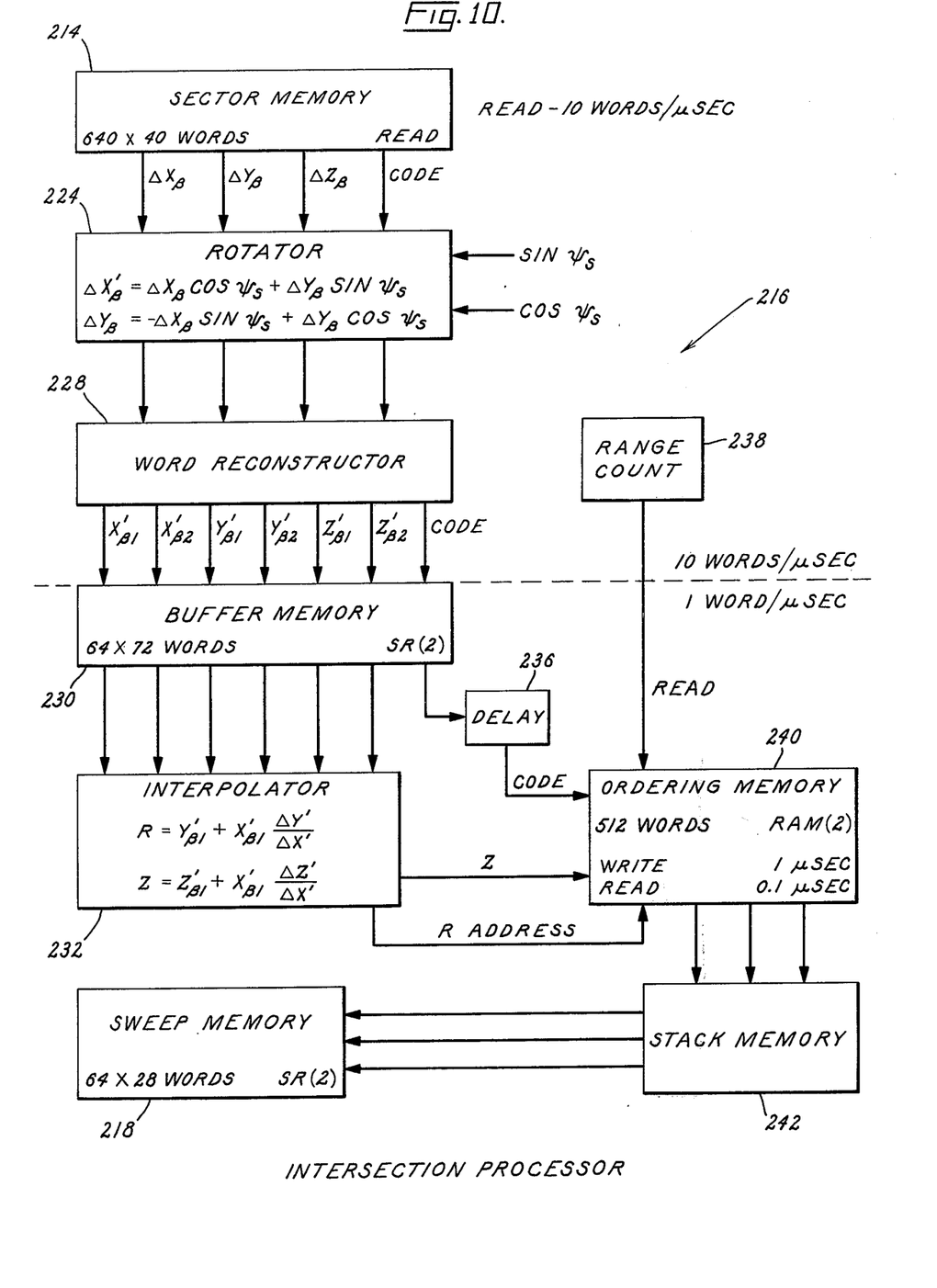
FIG. 10 represents a detail of FIG. 9.

FIG. 10 represents details of the operation of intersection processor 216 of FIG. 9. Sector memory 214 is repeated in the figure for convenience in understanding. Sector memory 214 is read out in terms of increments—that is, the increments from the preceding word data. This may be effected by putting the data in incremental form at some previous point in the equipment chain—even as far back as data base 202—or by providing a difference taker at the output of sector memory 214; the former is preferable, and completely conventional in the art. Rotator 224 receives the outputs of sector memory 214 in incremental form, and receives from computer 206 of FIG. 9 $\sin \psi_s$ and $\cos \psi_s$ for the particular sweep. It then calculates new values for the X and Y increments by the equations:

$$\Delta X' = \Delta X \cos \psi_s + \Delta Y \sin \psi_s$$

and $$\Delta Y' = -\Delta X \sin \psi_s + \Delta Y \cos \psi_s$$

These operations rotate the data base to the sweep coordinates. The incremental results are fed to word reconstructor 228, which reconstructs the word in non-incremental form. The outputs are in terms of the coordinates for two successive line endpoints. The CODE which gives information on the reflective or emissive properties of the planes bounded by the defined line is carried through unaltered. The outputs of reconstructor 228 are fed to pingponged buffer memory 230, from which they are fed to interpolator 232. The function of the buffer memory 230 is to separate calculations that have to be performed at 10 words/$\mu$ sec from calculations that can be performed at one word/$\mu$ sec. This timing is illustrated in FIG. 10. Interpolator 232 calculates the range R and the Z coordinate of the intersection of each line with the sweep plane by implementing the formulas:

$$R = Y'_1 + X'_1 \frac{\Delta Y'}{\Delta X'}$$

$$Z = Z'_1 + X'_1 \frac{\Delta Z'}{\Delta X'}$$

The output of interpolator 232 is read into ordering memory 240, using range as the address; the CODE output of buffer memory 230 is delayed by delay 236 so it will be read into ordering memory 240 simultaneously with the data from interpolator 232. Range counter 238 causes the range-addressed data to be read out serially in order of increasing range into stack memory 242, which reads it into sweep memory 218 (here repeated for clarity).

The mode of operation of sweep processor 220 of FIG. 9 is essentially disclosed by FIG. 8 of the first embodiment. Coded data arranged in order of range, for presentation in a given sweep are available in sweep memory 218. The bounding parameters are supplied by computer 206 of FIG. 9, as are the sweep parameters in which the angle $\psi$ corresponds to the azimuth angle $\theta_s$ of FIG. 8 on display 222 is the same as that on display 22: horizontal deflection is proportional to the tangent of the azimuth angle and vertical deflection is proportional to the tangent of the vertical angle of view.

The presentation pattern described is the most economical for use with my invention. However, if it is desired to employ my invention with a larger system in which another type of presentation, such as a conventional television raster, is standard, a scan converter may be used to convert the pattern with vertical sweep increasing in range into the other pattern. This, while it adds some extra expense, permits retaining the simplicity and economy of my basic invention. However, the image formation function, of producing a measure of visibility at each point defined by a given vertical and a given horizontal deflection, is in such case actually performed in the scan converter. When the scan converter is not used, the measure of visibility will be the visible signal produced in the display means; but when a scan converter is used, the measure of visibility will be the intensity signal stored in the scan converter. Thus for generality in defining my invention, the display means must be defined in more general terms as image formation means.

Since claim 1 is couched in means terms, the elements in the drawings pertaining to the first embodiment, and the appropriate specification references are given herewith to show the support for the recitals.
  a. Rotator 112 of FIG. 6; page 7 lines 6 through 9.
  b. Interpolator 116 of FIG. 6; page 17, lines 13 through 19.
  c. Divider 146 and register 150 of FIG. 8; page 20, line 22 through page 21, line
  d. Comparator 148 of FIG. 8; page 21, lines 17 through line 24.
  e. Code match 154 and buffer memory 156; page 2 lines 1 through 9.
  f. Display 22 of FIG. 8; the described characteristics are those well known for cathode-ray displays; the reason for the generalized terminology has been given above in the discussion of the possible use of a scan converter, whose input side has also the same well know properties.
  g. Page 22, line 18 through page 23 line 20 describes the recitals of this subparagraph.
     1. References 168 and 170 of FIG. 8.
     2. References 160 and 166 of FIG. 8.
     3. Reference 164 of FIG. 8 provides the decoding function; reference 162 provides the timing recited.

The term "optical characteristics" is generic to the various characteristics which may be employed in the practice of the invention. For example, in a black and white simulation only brightness is of interest; but in a more elaborate color simulation, brightness and color phase angle, or brightness of each of three or more color components may be stored for the simulation of an infrared image such as may be obtained by an image converter tube.

I claim:
  1. A simulator of a visual image, seen from an elevated viewpoint, of terrain described by a store comprising the three-dimensional coordinates of the end- points of terrain lines defining the boundaries between terrain planes approximating the surfaces of the terrain and encoded descriptions of the optical characteristics of the surfaces, comprising:

a. means to define a series of sweeps, each in a vertical sweep plane including the elevated viewpoint and its ground position, at successive scan angles measured in a ground plane, the totality of such scans extending over the portion of the terrain to be simulated;

b. means to calculate the coordinates of the intersection with each sweep plane of each terrain line intersecting the sweep plane;

c. means to calculate the tangent of the angle between a reference line extending from the viewpoint in the sweep plane and a view line from the viewpoint to each said intersection;

d. means to compare the said tangent for each intersection with the tangents for the intersections preceding it in range in the sweep plane, measured from the ground position of the observation point, and to produce, responsively to the result of such comparison, an output signal indicating that the view line to the said intersection lies above the view line to any preceding intersection and the said intersection is therefore visible from the viewpoint;

e. means responsive to the said comparator means output signal to store for presentation the coordinates of each visible intersection and the encoded optical characteristics of the terrain planes bounded by it;

f. image formation means adapted to be deflected vertically by a vertical deflection signal and to be deflected horizontally by a horizontal deflection signal, and to produce at any point to which it is thereby deflected a measure of visibility of intensity controllable by an intensity signal;

g. means to receive the data stored for presentation and, responsively thereto, to apply to the image formation means         1. a horizontal deflection signal proportional to the tangent of the scan angle;

2. a vertical deflection signal varying continuously between a minimum and a maximum value during the existence of a given horizontal deflection signal;

3. an intensity signal produced by decoding the encoded optical characteristics stored for display, during the time when the vertical deflection signal lies between values proportional to the tangent for a first visible intersection and the tangent for the next visible intersection bounding the terrain plane having the said encoded optical characteristics, and the horizontal deflection signal has a value proportional to the tangent of the scan angle of the sweep plane in which are the said intersections.

2. A simulator of a visual image, seen from an elevated viewpoint, of terrain described by a store comprising the three-dimensional coordinates of the endpoints of terrain lines defining the boundaries between terrain planes approximating the surface of the terrain and encoded descriptions of the optical characteristics of the surfaces, comprising:

a. means to calculate and store, for each plane in a plurality of vertical planes extending at various azimuth angles through the ground position of the viewpoint, the coordinates of those intersections of terrain lines with the plane which are visible from the viewpoint, and the encoded descriptions of the optical characteristics of the surfaces bounded by the said intersections;

b. means to receive the stored data and, responsively thereto, to display in a plurality of vertical lines each horizontally spaced proportionally to the tangent of the azimuth angle of a vertical plane, visible traces representative of the encoded optical characteristics bounded by two said adjacent intersections in the plane over a vertical distance, in the line, whose endpoints are displaced vertically proportionally to the tangents of the angle between a line from the viewpoint to the said intersections and a horizontal line.

* * * * *